US008732269B2

(12) United States Patent
Serenyi et al.

(10) Patent No.: US 8,732,269 B2
(45) Date of Patent: May 20, 2014

(54) METHODS AND APPARATUSES FOR TRANSFERRING DATA

(75) Inventors: Denis Serenyi, Menlo Park, CA (US); Chris LeCroy, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 13/313,958

(22) Filed: Dec. 7, 2011

(65) Prior Publication Data

US 2012/0079072 A1 Mar. 29, 2012

Related U.S. Application Data

(60) Division of application No. 11/496,855, filed on Jul. 31, 2006, now Pat. No. 8,078,747, which is a continuation of application No. 09/603,108, filed on Jun. 22, 2000, now Pat. No. 7,191,242.

(51) Int. Cl.
*G06F 15/16* (2006.01)

(52) U.S. Cl.
USPC ........................................................ 709/217

(58) Field of Classification Search
USPC ........................................................ 709/217
See application file for complete search history.

(56) References Cited

U.S. PATENT DOCUMENTS

| 5,592,612 | A | | 1/1997 | Birk |
| 5,737,531 | A | * | 4/1998 | Ehley ............................ 709/208 |
| 5,847,771 | A | * | 12/1998 | Cloutier et al. ............... 348/564 |
| 5,918,020 | A | | 6/1999 | Blackard et al. |
| 5,953,506 | A | * | 9/1999 | Kalra et al. .................... 709/231 |
| 5,956,321 | A | | 9/1999 | Yao et al. |
| 6,014,694 | A | * | 1/2000 | Aharoni et al. ............... 709/219 |
| 6,078,958 | A | | 6/2000 | Echeita et al. |
| 6,134,596 | A | | 10/2000 | Bolosky et al. |
| 6,202,096 | B1 | * | 3/2001 | Williams et al. .............. 709/230 |
| 6,252,889 | B1 | | 6/2001 | Patki et al. |
| 6,263,371 | B1 | | 7/2001 | Geagan et al. |
| 6,275,471 | B1 | | 8/2001 | Bushmitch et al. |

(Continued)

FOREIGN PATENT DOCUMENTS

| JP | 10042295 A | 12/1998 |
| WO | WO 97/22201 A2 | 6/1997 |
| WO | WO 99/37057 | 7/1999 |
| WO | WO 00/27087 A1 | 5/2000 |

OTHER PUBLICATIONS

XingTech. "What is Stream Thinning?" Dec. 25, 1996. pp. 1-4.*

(Continued)

*Primary Examiner* — Imad Hussain
(74) *Attorney, Agent, or Firm* — Kenyon & Kenyon LLP

(57) ABSTRACT

The present invention provides several methods and apparatuses for transmitting multimedia data using streaming media protocols such as real-time transfer protocols (RTP) and real-time streaming protocols (RTSP) in a computer network environment. In one exemplary embodiment, a request for RTP data and its associated extension is sent from the caching proxy server to the server. The request may be for one specific type of data or multiple unrelated types of data. The server responds to the request indicating its support for the requested RTP extension data. The caching proxy server determines whether to proceed or terminate the data transmission process based on the response provided by the server. If it is determined to proceed with the data transmission process, the caching proxy informs the server to send the requested and supported RTP data. The server sends the requested data in a variable and extendible header format.

27 Claims, 13 Drawing Sheets

(56) References Cited

U.S. PATENT DOCUMENTS

| | | | |
|---|---|---|---|
| 6,289,388 B1* | 9/2001 | Disney et al. | 709/238 |
| 6,300,887 B1 | 10/2001 | Le | |
| 6,359,656 B1 | 3/2002 | Huckins | |
| 6,401,126 B1 | 6/2002 | Douceur et al. | |
| 6,405,256 B1 | 6/2002 | Lin et al. | |
| 6,408,128 B1* | 6/2002 | Abecassis | 386/239 |
| 6,415,327 B1 | 7/2002 | Beckerman et al. | |
| 6,445,738 B1* | 9/2002 | Zdepski et al. | 375/240.01 |
| 6,505,169 B1 | 1/2003 | Bhagavath et al. | |
| 6,546,421 B1 | 4/2003 | Wynblatt et al. | |
| 6,587,985 B1 | 7/2003 | Fukushima et al. | |
| 6,594,699 B1 | 7/2003 | Sahai et al. | |
| 6,603,883 B1* | 8/2003 | Hamanaka | 382/239 |
| 6,625,258 B1 | 9/2003 | Ram et al. | |
| 6,629,138 B1 | 9/2003 | Lambert et al. | |
| 6,639,896 B1 | 10/2003 | Goode et al. | |
| 6,674,477 B1* | 1/2004 | Yamaguchi et al. | 348/387.1 |
| 6,708,213 B1 | 3/2004 | Bommaiah et al. | |
| 6,711,131 B1 | 3/2004 | Shiobara | |
| 6,747,991 B1* | 6/2004 | Hemy et al. | 370/468 |
| 6,771,644 B1 | 8/2004 | Brassil et al. | |
| 6,980,667 B2 | 12/2005 | Hamanaka | |
| 7,013,322 B2 | 3/2006 | Lahr | |
| 7,398,320 B1 | 7/2008 | Minakuchi et al. | |
| 7,627,886 B2* | 12/2009 | Barbanson et al. | 725/90 |
| 7,739,715 B2* | 6/2010 | He et al. | 725/90 |
| 2001/0031003 A1* | 10/2001 | Sawhney et al. | 375/240.14 |
| 2003/0140159 A1* | 7/2003 | Campbell et al. | 709/231 |
| 2004/0267952 A1* | 12/2004 | He et al. | 709/231 |
| 2006/0259949 A1 | 11/2006 | Schaefer et al. | |

OTHER PUBLICATIONS

Hoffman et al., "RTP Payload Format for MPEG1/MPEG2 Video", Jan. 1998.

Chinen, K. et al., "An Interactive Prefetching Proxy Server for Improvement of WWW Latency", Proceedings of INET: The Internet: The Global Frontiers, vol. 1/3, Jun. 8, 1997, XP002086569, 83 pages.

Civanlar, M. Reha, "Protocols for Real-Time Multimedia Data Transmission over the Internet", Acoustics, Speech and Signal Processing, 1998. Proceedings of the 1998 IEEE International Conference on Seattle, WA USA May 12-15, 1998. IEEE vol. 6, May 12, 1998, pp. 3809-3812 XP010279676 ISBN 07803 4228 6.

Griwodz, Carsten et al. "Affordable Infrastructure for Stream Playback in the Internet," Darmstadt University of Industrial Process and System Communications (KOM), Technical Report TR-KOM-1999-07, Darmstadt, Germany (Dec. 12, 1999).

Hoffman, D. et al. "RTP Payload Format for MPEG1/MPEG2 Video," Jan. 1998, RFC 2250.

PCT International Search Report for PCT International Application No. US01/20044 mailed May 22, 2002, 8 pages.

Schulzrinne, H. et al. "Internet Telephony: Architecture and Protocols—an IETF Perspective," *Computer Networks*, Elsevier Science Publishers: Amsterdam, 31:3 (Feb. 11, 1999), pp. 237-255.

Schulzrinne, H., et al. "RTP: A Transport Protocol for Real-Time Applications," *Network Working Group RFC 1889 RTP* (Jan. 1996), pp. 1-75.

\* cited by examiner

METHODS AND APPARATUSES FOR TRANSFERRING DATA

This application is a divisional of U.S. application Ser. No. 11/496,855 filed on Jul. 31, 2006 now U.S. Pat. No. 8,078, 747, which is a continuation of U.S. application Ser. No. 09/603,108, filed on Jun. 22, 2000, now U.S. Pat. No. 7,191, 242.

FIELD OF THE INVENTION

The present invention relates to the field of multimedia data transmission. In particular, the present invention in one exemplary embodiment relates to multimedia data transmission of real-time transfer protocol (RTP) packets using real time streaming protocol (RTSP) in a computer network environment.

INTRODUCTION AND BACKGROUND OF THE INVENTION

Methods of transmitting data are commonly known and performed today on a routine basis to send various multimedia data such as text, graphics, audio, video, images etc. across computer networks situated in various parts of the world. Generally the transmission process requires both hardware and software for performing its function. Typically, the hardware includes various types of personal computers and hand held multimedia data sending or receiving devices. These devices run under the control of an operating system and utilize multimedia application software programs. As is known in the art, streaming media data is data which is transmitted to a receiving computer system and presented (usually after buffering temporarily at the receiving system) and then discarded (not stored) at the receiving system.

Currently, data is sent in form of packets from one multimedia device to another. A large amount of information is required to be sent in a real-tune manner in the data packets, which imposes a heavy load on the systems. Streaming media data, such as Real-Audio data in streaming media format specified by Real-Networks, is sent through the Internet is near real-time manner in many cases.

In one approach, the components involved in data transmission of streaming media are known to be a server (which may be referred to as originating server), a caching proxy server and a client. These components in various combinations communicate with each other for transmitting data packets in real-time. The communication link that currently exists between the components uses real-tune transfer protocols (RTP) and real-time streaming protocols (RTSP) to communicate and send packets to each other. For this approach to work, a caching proxy server needs to communicate with the system server, receive a stream of RTP data packets, and transfer the information contained within the RTP data packets to a client. FIG. 1a shows an example of a prior method in which a caching proxy server receives streaming media data and provides this data to a client. In order to perform its function properly and efficiently, the caching proxy server needs several pieces of information from the server to be able to cache an RTP stream easily and reliably.

A problem with the current approach is that it is not able to provide some of the key required information such as data packet transmit time and video packet frame type information that a caching proxy needs to be efficient.

This information allows a caching proxy server to provide smooth packet delivery to its client by knowing the time an RTP data packet was intended to be sent, and type of video frame that is being sent without knowing the specific payload format. Another problem with the current approach is chat it is not able to provide multiple pieces of unrelated data in one delivery to the caching proxy server, furthermore, packets from the server may be "lost" and never reach the caching proxy server. In addition, there is normally no way to recreate a complete "pristine" copy at the caching proxy server.

Prior art servers communicate RTP information to the caching proxy server by sending information through a cache-control header. In one approach, a cache-control header contains normal header fields. In another approach, unrelated to cache control of RTP information, a single type of additional information has been added to the normal fields in a header extension format without specifying the type of additional information. In this approach only a single piece of RTP extension can be added to the normal field of the header and sent at anyone time.

A problem with using this limited, non-extensible approach is that a server is not able to attach multiple sets of unrelated data at a time to send to the caching proxy server. Another problem with this approach is that the header extension used in these methods are still not able to provide all the information a caching proxy server needs to cache a stream properly and to transmit the stream properly. Yet another problem with this approach is that there is no way to identify the particular extension independently of other possible extensions.

SUMMARY OF THE INVENTION

The present invention provides several methods and apparatuses for transmitting multimedia data using streaming media protocols such as real-time transfer protocols (RTP) and real-time streaming protocols (RTSP) in a computer network environment. In one exemplary embodiment, a request for RTP data is sent horn the caching proxy server to the server. The request may be for one specific type of data and its related extensions or multiple unrelated types of data and their related extensions. The server responds to the request indicating its support for the requested RTP data. The caching proxy server determines whether to proceed or terminate the data transmission process based on the response provided by the server. If it is determined to proceed with the data transmission process, the caching proxy informs the server to send the requested and supported RTP data. The server sends the requested data in a variable and extendible header format.

In another embodiment, the caching proxy server requests and receives packet transmit time data and/or packet frame type data from the server. The caching proxy server uses the frame type data to communicate with the client and supply frames based on client's capacity to handle loads at given times. Transmit time data is also used by the caching proxy to store packets locally and deliver these packets at appropriate times to the client for a smooth packet delivery.

Other features and advantages of the present invention will be apparent from the accompanying drawings, and from the detailed description, which follows below.

BRIEF DESCRIPTION OF THE DRAWINGS

The present invention is illustrated by way of example and not limited by the figures of the accompanying drawings in which like references indicate similar elements and in which.

DETAILED DESCRIPTION

A method and system for providing multimedia data transmission using real-time transfer protocol (RTP) and real time streaming protocol (RTSP) are described. For purposes of explanation, numerous specific details are set forth in order to provide a thorough understanding of the present invention. For example, various computer network system architectures and digital processing system architectures are provided for illustrative purposes rather than to be construed as limitations of the present invention. It will be evident, however, to one skilled in the art that the present invention may be practiced without these specific details. In other instances, well-known structures and devices are shown in block diagram form to facilitate explanation.

Figure 1A:
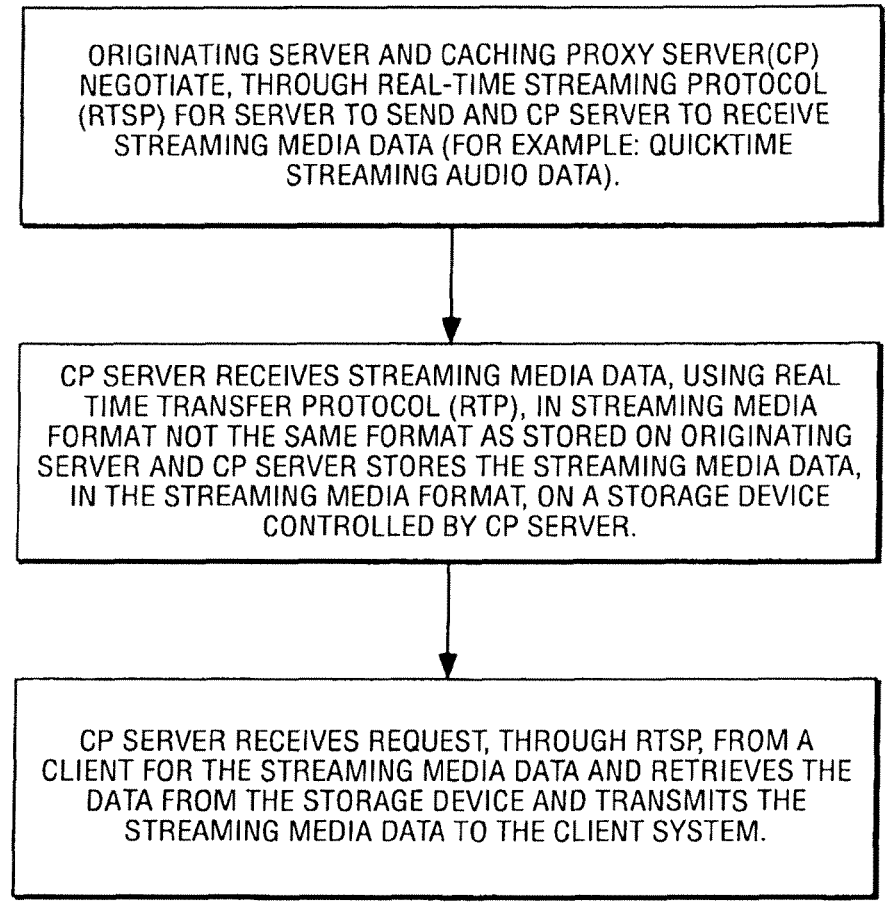
FIG. 1a is a flowchart which shows a method in the prior art for transferring streaming media data to caching proxy server and then to a client.
Figure 1B:
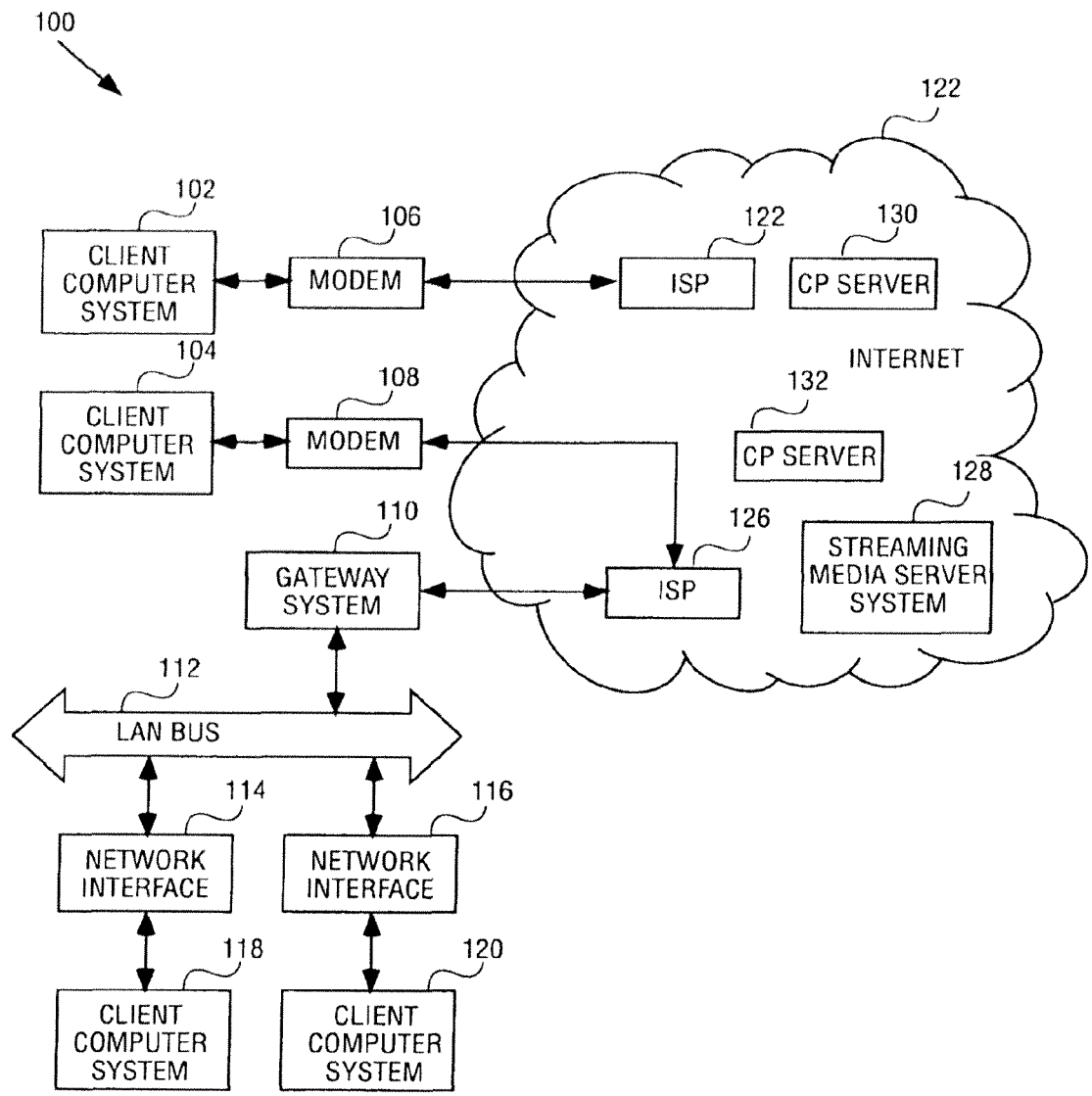
FIG. 1b illustrates a network of computer systems in which media data may be exchanged and/or processed, according to one embodiment of the present invention.

FIG. 1b is a diagram of a network of computer systems in which media data may be processed, according to one embodiment of the present invention. As shown in FIG. 1b, a number of client computer system, one or more of which may represent one implementation of a receiving system, are coupled together through an Internet 122. It will be appreciated that the term "Internet" refers to a network of networks.

Such networks may use a variety of protocols for exchange of information, such as TCP/IP, ATM, SNA, SDI, RTP, RTSP etc. The physical connections of the Internet and the protocols and communication procedures of the Internet are well known to those in the art. Access to the Internet 103 is typically provided by Internet service providers (ISPs), such as the ISP 124 and the ISP 126, which may also be connected with caching proxy servers 130 and 132. Users on client systems, such as the client computer systems 102, 104, 118, and 120, generally obtain access to the Internet through Internet service providers, such as ISPs 124 and 126, which may also be connected through the internet with caching proxy servers 130 and 132. Access to the Internet may facilitate transfer of information (e.g., email, text files, media files, etc.) between two or more digital processing systems, such as the client computer systems 102, 104, 118, and 120 and/or a streaming media server system 128 which may be considered an originating server from which caching proxy servers receive streaming media data. For example, one or more of the client computer systems 102, 104, 118, and 120 and/or the streaming media server 128 may provide media data (e.g., video and audio, or video, or audio) to another one or more of the client computer systems 102, 104, 118, and 120 and/or the streaming media server 128. Such may be provided in response to a request. As described herein, such media data may be transferred in the system 100 according tracks. Such tracks, in one embodiment of the invention, may be created according to a specific format of the streaming media data and/or a specific data communication (e.g., network) protocol(s).

The streaming media server 128 is typically comprised of at least one computer system to operate with one or more data communication protocols, such as the protocols of the World Wide Web, and as such, is typically coupled to the Internet 122. Optionally, the streaming media server 128 may be part of an ISP which may provide access to the Internet and/or other network for client computer systems. The client computer systems 102, 104, 118, and 120 may each, with appropriate web browsing software, access data, such as HTML documents (e.g., Web pages), which may be provided by the streaming media server 128. Such data may provide media, such as QuickTime movies or QuickTime streaming media data, which may be presented by the client computer systems 102, 104, 118, and 120.

The ISP 124 provides Internet connectivity to the client computer system 102 via a modem interface 106, which may be considered as part of the client computer system 102. The client computer system may be a conventional computer system, such as a Macintosh computer, a "network" computer, a handheld portable computer, a Web TV system, or other types of digital processing systems (e.g., a cellular telephone having digital processing capabilities). Similarly, the ISP 126 provides Internet connectivity for the client computer systems 104, 118 and 120, although as depicted in FIG. 1b, such connectivity may vary between various client computer systems, such as the client computer systems 102, 104, 118, and 120. For example, as shown in FIG. 1b, the client computer system 104 is coupled to the ISP 126 through a modem interface 108, while the client computer systems 118 and 126 are part of a focal Area Network (FAN). The interfaces 106 and 108, shown as modems 106 and 108, respectively, in FIG. 1b, may be an analog modem, an ISDN modem, a cable modem, a satellite transmission interface (e.g., "Direct PC"), a wireless interface, or other interface for coupling a digital processing system, such as a client computer system, to another digital processing system. The client computer systems 118 and 120 are coupled to a FAN bus 112 through network interfaces 114 and 116, respectively. The network interfaces 114 and 116 may be an Ethernet-type, Asynchronous Transfer Mode (ATM), or other type of network interface. The FAN bus is also coupled to a gateway digital processing system 110, which may provide firewall and other Internet-related services for a LAN. The gateway digital processing system 110, in turn, is coupled to the ISP 126 to provide Internet connectivity to the client computer systems 118 and 120. The gateway digital processing system 110 may, for example, include a conventional server computer system. Similarly, the streaming media server 128 may, for example, include a conventional server computer system.

The system 100 may allow one or more of the client computer systems 102, 104, 118, and 120 and/or the streaming media server 128 to provide media data (e.g., video and audio, or video, or audio) to another one or more of the client computer systems 102, 104, 118, and 120 and/or the streaming media server 128. Such data may be provided, for example, in response to a request by a receiving system, which may be, for example, one or more of the client computer systems 102, 104, 118, and 120.

Figure 2:
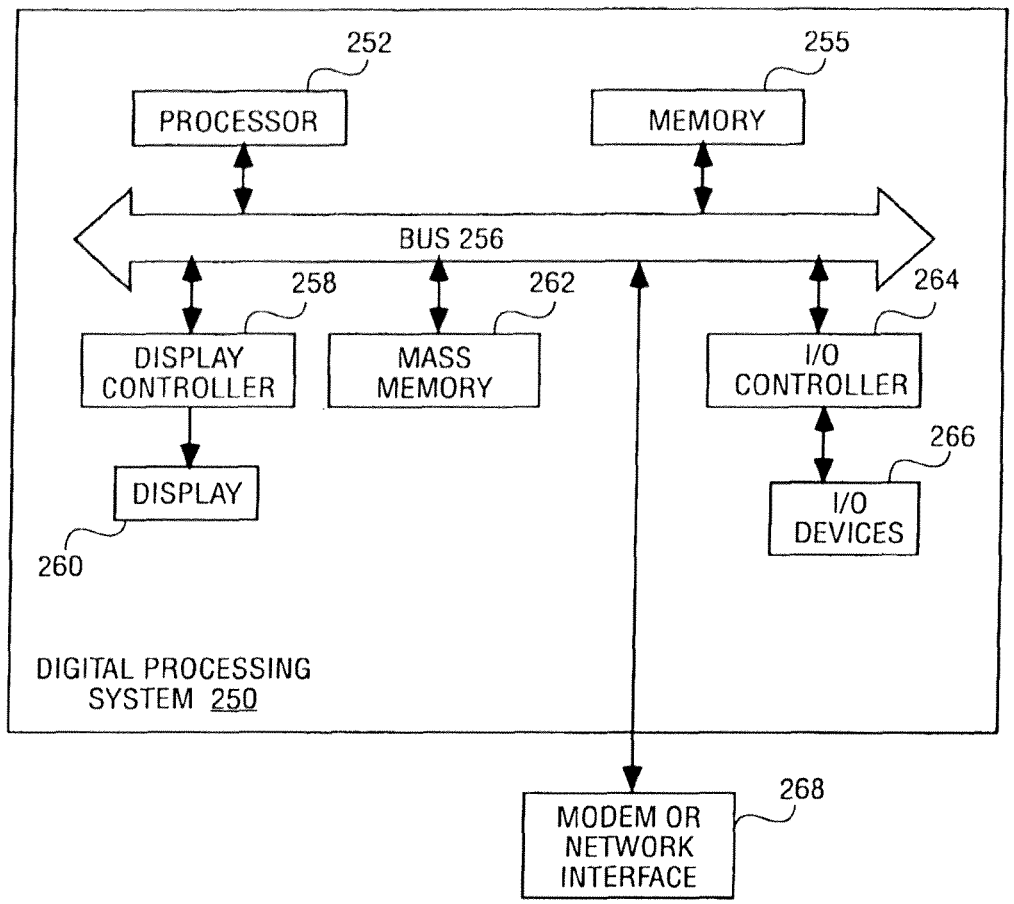
FIG. 2 illustrates a block diagram of an exemplary digital processing system, which may be used in accordance with one embodiment of the present invention.

FIG. 2 is a block diagram of an exemplary digital processing system which may be used in accordance with one embodiment of the present invention. For example, the digital processing system 250 shown in FIG. 2 may be used as a client computer system, a streaming media server system, a conventional server system, etc. Furthermore, the digital processing system 250 may be used to perform one or more functions of an Internet service provider, such as the ISP 124 or 126. The digital processing system 250 may be interfaced to external systems through a modem or network interface 268. It will be appreciated that the modem or network interface 268 may be considered as part of the digital processing system 250. The modem or network interface 168 may be an analog modem, an ISDN modem, a cable modem, a token ring interface, a satellite transmission interface, a wireless interface, or other interface(s) for providing a data communication link between two or more digital processing systems.

The digital processing system 250 includes a processor 252, which may represent one or more processors and may include one or more conventional types of such processors, such as a Motorola PowerPC processor, an Intel Pentium (or x86) processor, etc. A memory 255 is coupled to the processor 252 by a bus 256. The memory 255 may be a dynamic random access memory (DRAM) and/or may include static RAM (SRAM). The processor may also be coupled to other types of storage areas/memories (e.g., cache, Flash memory, disk, etc.), winch could be considered as part of the memory 255 or separate from the memory 255.

The bus 256 further couples the processor 252 to a display controller 258, a mass memory 262, the modem or network interface 268, and an input/output (I/O) controller 264. The mass memory 262 may represent a magnetic, optical, magneto-optical, tape, and/or other type of machine-readable medium/device for storing information. For example, the mass memory 262 may represent a hard disk, a read-only or writable optical CD. etc. The display controller 258 controls in a conventional manner a display 260, which may represent a cathode ray tube (CRT) display, a liquid crystal display (LCD), a plasma display, or other type of display device. The I/O controller 264 controls 170 device(s) 266, which may include one or more keyboards, mouse/trackball or other pointing devices, magnetic and/or optical disk drives, printers, scanners, digital cameras, microphones, etc.

It will be appreciated that the digital processing system 250 represents only one example of a system, which may have many different configurations and architectures, and which may be employed with the present invention. For example, Macintosh and Intel systems often have multiple busses, such as a peripheral bus, a dedicated cache bus, etc. On the other hand, a network computer, which may be used as a digital processing device of the present invention, may not include, for example, a hard disk or other mass storage device, but may receive routines and/or data from a network connection, such as the modem or interface 268, to be processed by the processor 252. Similarly, a Web TV system, which is known in the art, may be considered to be a digital processing system of the present invention, but such a system may not include one or more I/O devices, such as those described above with reference to I/O device(s) 266. Additionally, a portable communication and data processing system, which may employ a cellular telephone and/or paging capabilities, may be considered a digital processing system which may be used with the present invention.

In the system 250 shown in FIG. 2, the mass memory 262 (and/or the memory 254) may store media (e.g., video, audio, movies, etc.) which may be processed according the present invention (e.g. by way of tracks). Alternatively, media data may be received by the digital processing system 250, for example, via the modem or network interface 268, and stored and/or presented by the display 260 and/or I/O device(s) 266. In one embodiment, packetized media data may be transmitted across a data communication network, such as a LAN and/or the Internet, in accordance with tracks. On the other hand, the processor 252 may execute one or more routines to use a file with one or more tracks, or alternatively, to create one or more tracks, to process media (e.g., a pre-packaged movie, audio file, video file, etc.) for presentation or packetization according to the tracks. Such routines may be stored in the mass memory 262, the memory 264, and/or another machine-readable medium accessible by the digital processing system 250. In one embodiment, the digital processing system 250 may process media data having tracks embedded therein. Similarly, such embedded media data may be stored in the mass memory 262, the memory 264, and/or another machine-readable medium accessible by the digital processing system 250.

Figure 3:
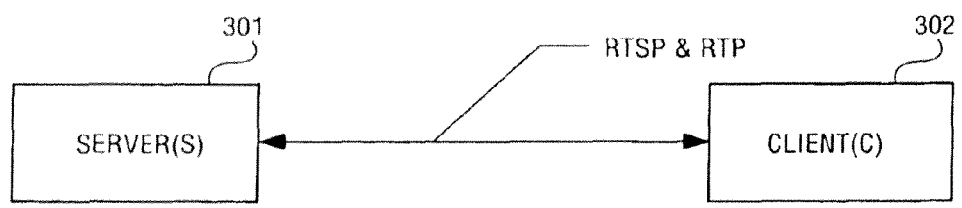
FIG. 3 illustrates one embodiment of a communication method between a server and a client using RTSP and RTP protocols.

FIG. 3 shows an example of components involved in data transmission scenario. An originating server 301 and a client 302 are shown as components involved in carrying out transmission of streaming media data using RTP and RTSP protocols as one embodiment of the present invention. The originating server 301 and the client 302 may communicate directly with each other or may communicate through an intermediary such as a caching proxy server. In one embodiment, the server 301 and the client 302 may be on separate local area networks (LAN). In another embodiment the server 301 and the client 302 may be connected through a wide area network. There may be either one or several clients 302 that are in communication with the server 301 directly or indirectly through an intermediary, such as the Internet. The server 301 and client 302 may interact with each other for sending various types of streaming media data in various formats. In one embodiment, the streaming media data may be sent in a downstream direction from server 301 to client 302. In another embodiment the client 302 may send requests and other streaming media data information to server 301.

Figure 4:
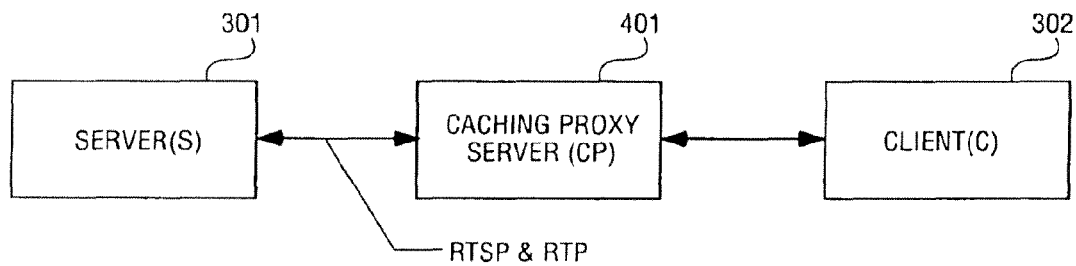
FIG. 4 illustrates another embodiment of a communication method between a server, caching proxy server and a client.

FIG. 4 shows an example of one embodiment of a communication relationship between a client 302, a caching proxy server (CP) 401 and the originating server 301. There may be several types of connections between these components, but preferably the client 302 may be in communication with the caching proxy server 401 through an Internet connection, and the caching proxy server 401 may be in communication with the originating server 301 through an Internet connection A caching proxy server 401 may be connected through the Internet with a single client 302 or several clients 302. The caching proxy server 401 and its connected clients 302 may be on the same local area network or may be connected through a wide area network. In one embodiment it is preferable that the caching proxy server 401 and client 302 or clients 302 are connected through a local area network and in close proximity to each other. An exemplary embodiment of close proximity connection may be connection in the same company etc. where the connection may utilize a high bandwidth interface. The communicational link between the caching proxy server 401 and client 302 may be of a variety of types such as direct cable, fiber optic, radio frequency etc. These links may change and vary based on the need of a particular client 302 and advancements in technology.

A originating server 301 and a caching proxy server 401 may communicate using a communicational link such as direct cable, fiber optic, radio frequency etc. These links may change and vary based on a particular need and advancements in technology. The cashing proxy 401 may act as an intermediary between the originating server 301 and client 302 to transfer streaming media data and assist in smooth delivery of RTP packets from server 301 to client 302. In so doing, a caching proxy server 401 may perform several of its own functions. In one embodiment the caching proxy 401 functions may be thinning frames, storing streaming media data locally, and transmitting streaming media data at offset times to client 302. In another embodiment the caching proxy server's 401 functions may be negotiating with originating sever 301 for various RTP extension associated with various types of streaming media data, and receiving or responding to various client 302 requests etc. In one embodiment, one of the objectives of a caching proxy server 401 is to deliver a pristine and good quality copy of streaming media data to the client 302 and do so in an efficient and speedy manner.

Typically a client 302 may sent a request directly to the caching proxy server 401. The caching proxy server 401 may then react to the client 302 request and either fetch the requested items from the system server or responds on its own. Its own response may be from a copy of streaming media data which has already been obtained from an originating server and which has been stored on a storage device controlled by the caching proxy server (e.g. a local hard disk of the caching proxy server). However the system may also be configured for the client 302 to send requests directly to the system server 301 and have the server 301 respond back directly to the client 302 or indirectly to the client 302 through a caching proxy server 401.

Figure 5:
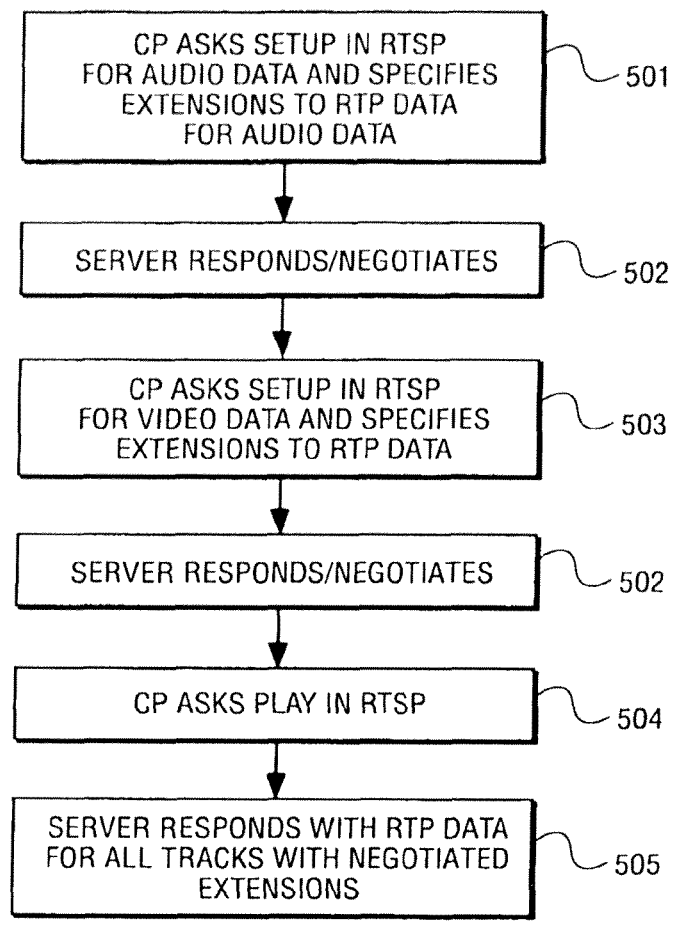
FIG. 5 illustrates one embodiment of a RTSP, RTP negotiation process between a caching proxy and a server.

FIG. 5 shows one exemplary method according to an embodiment of the present invention. In the operations of FIG. 5, an originating server (e.g. server 301) and a caching proxy server 401 communicate with each other to assist in smooth transmission of streaming media data. This communication aids smooth packet delivery in many ways including allowing the caching proxy server 401 to deliver to the client 302 good qualify streaming media data at a high speed. In addition, the communication also aids in assisting and managing client's load by ensuring that the client 302 gets a manageable amount of streaming media data and no frames are dropped in the process or only less important frames dropped in the process (through frame thinning).

Initially in operation 501, the caching proxy server requests streaming media data from an originating server. The request may be made by asking the server 301 for "setup" in RTSP for audio or video streaming media data. The request may be for one type of streaming media data or several types of streaming media. The request may be for similar or unrelated types of streaming media data. The server 301 receives the request from the caching proxy server 401, and the server 301 responds in the manner described with respect to operation 502 of FIG. 5. The "SETUP" request in RTSP in operation 501 may be initiated by the caching proxy server 401, independently of a client system 302 requesting streaming media data or the request in operation 501 may be initiated by a client system 302 requesting the streaming media data from the caching proxy server 401 which in turn requests the requested streaming media data from the server 301 (if the caching proxy server 401 does not already have the requested streaming media data stored under its control, such as a local hard disk of the caching proxy server 401). The caching proxy server 401 may also log client's IP address for subsequent communication in the case where a client initiated the request.

The caching proxy server 401 and originating server 301 may establish a communication process in which the caching proxy server 401 and the originating server 301 may engage in a negotiation process 502 for communicating back and forth in order to aid a smooth streaming media data packet transmission. As shown in operation 501, the caching proxy server 401 may communicate with the originating server 301 and request (e.g. by specifying names of RTP extensions) a set of RTP extensions associated with the streaming media data to be sent to the caching proxy server 401. The set of extensions requested to the server 301 may be the same as the set of requests sent to the caching proxy server 401 from the client 302 (in those cases where the client specifies RTP extensions, such as security extensions, for its use).

The server 301 receives the request for RTP extensions from the caching proxy server 401. The server 301 may then run its internal processes to determine whether the server 301 supports the requested RTP extensions. The outcome of this determination may be that the server 301 supports some but not all the requested RTP extensions, or that the server 301 supports none of the requested RTP extensions, or that the server 301 supports all of the requested RTP extensions. The server 301 may respond in operation 502 to the caching proxy server 401 by informing the caching proxy server 401 of the server's 301 supported RTP extensions. The server 301 may choose to respond 502 by indicating only the supported RTP extensions or may respond by indicating both the supported and unsupported RTP extensions, or the server 301 may not respond at all indicating no support for requested extensions. In one embodiment the response may be in an echo form or any several other forms. In one echo form of the invention, the server transmits the names of the requested RTP extensions and an associated code for each named extension.

The caching proxy server 401 receives a response from the server 301 indicating the supported RTP extensions or both the supported and unsupported RTP extensions. The caching proxy server 401 may check to see if a response has been sent for all the RTP extensions it had earlier requested. Caching proxy server 401 may have received none, one, some, or all responses to the requested RTP extensions. Caching proxy server 401 may evaluate further to check if any of the server 301 unsupported RTP extensions are required for streaming media data transmitting process. Required RTP extensions may be defined as RTP extensions that are necessary for carrying on a particular data transmission operation such as frame thinning etc at the caching proxy server 401. As shown in FIG. 5, operations 501 and 502 relate to setup and negotiation for an audio track while operations 503 and 504 relate to similar setup and negotiation for a video/image track.

In one embodiment, the caching proxy server 401 may request multiple sets of RTP extensions at a time from the server 301. If the RTP extensions requested are required and unsupported by the server 301, then caching proxy server 401 may decide to terminate the negotiation process. It may also be the case that some of the extensions are supported and some are not. In such a situation, if the unsupported extensions are not required for the data transmission process then caching proxy server 401 may decide to proceed further and receive the supported extensions and the associated streaming media data. In another embodiment the caching proxy 402 may not receive a response for any of the RTP extensions requested. In such a case the caching proxy 402 may choose to terminate the negotiation process with the server 301.

If the caching proxy server 402 decides not to terminate the negotiation process and to request the supported RTP extensions and streaming media data, it may send a request to the server 301 to send the streaming media data and the associated supported RIP extensions in operation 504. In the example of FIG. 5, this request for the streaming media data and the associated RTP extensions occurs when the caching proxy server 401 sends a "PLAY" command in the RTSP protocol.

The server 301 in operation 505, responds to the "PLAY" command by sending the streaming media data and by sending the requested and supported RTP extensions, which is associated with the streaming media data, to the caching proxy server 401 in a extended header format. This header may contain one, two or three similar or unrelated RTP extensions.

Upon receiving the streaming media data and receiving RTP extensions from the server 301, the caching proxy 401 may store the streaming media data and the RTP extensions in a storing facility 601 (e.g. a storage device controlled by the caching proxy sever 401, such as a local hard disk of the server 401) and terminate the transmission process with the server 301. The caching proxy 401 may again reinitiate the negotiation process and repeat all the back and forth if another request for streaming media is submitted by the client 302. This request may be similar or completely different from prior requests. Some of the extensions that may be requested by the cashing proxy sever 401 may be a transmit time sub-extension denoted by symbol "trti", or frame type sub-extension denoted by symbol "ftry", or packet position sub-extension denoted by symbol "papo". Other extensions may also be requested (e.g. an extension which is used by the client 302 or server 401 to maintain a secure or encrypted or authenticated communication between client 302 and server 401).

For example, in one cycle of its operation a caching proxy server 401 may ask for three separate RTF sub-extensions one of which may be frame type sub-extension denoted by symbol "frty" (used in frame thinning by caching proxy server 401 as described below), the other may be transmit type sub-extension denoted by "trti" (used by the caching proxy server 401 as described below), and the last may be packet position sub-extension denoted by "papo" (which may be used to retrieve lost or missing packets). Let us also assume for the illustration of this example that "frty" sub-extension is required for the streaming media data transmission process. "Frty" may be denoted as a required sub-extension due to several reasons. One of the reasons may be that the client 302 cannot receive or process the data at a high data rate (and so frame thinning is required) and "frty" sub-extension will assist the data transmission process between a caching proxy server and the client 302 by allowing the caching proxy sever to perform frame thinning and therefore may be "necessary".

The caching proxy 402 may receive the request and communicate with the server 301 by sending a single request to the server 301 asking for both sub-extensions. Let us assume further for the illustration of this example that the server 301 can only support one of the two RTF extensions. The server 301 may then send a response back to the caching proxy server indicating which sub-extension is supported.

If the supported sub-extension happens to be only "trti", or "papo" or both but not "frty" then the caching proxy 402 will terminate the negotiation process between the caching proxy 402 and the server 301. This is because "frty" was a required extension to the data transmission process and since it is not supported by the server 301, the caching proxy 402 may not proceed further. If however, the supported sub-extension happens to be only "frty", or frty and papo, or frty and trti, or frty, papo and trti, then the caching proxy server 401 may proceed further with the transmission process. The caching proxy server 401 in this instance may choose not to terminate the process since the required sub-extension thy is present in the response as supported by the server 301.

Figure 6:
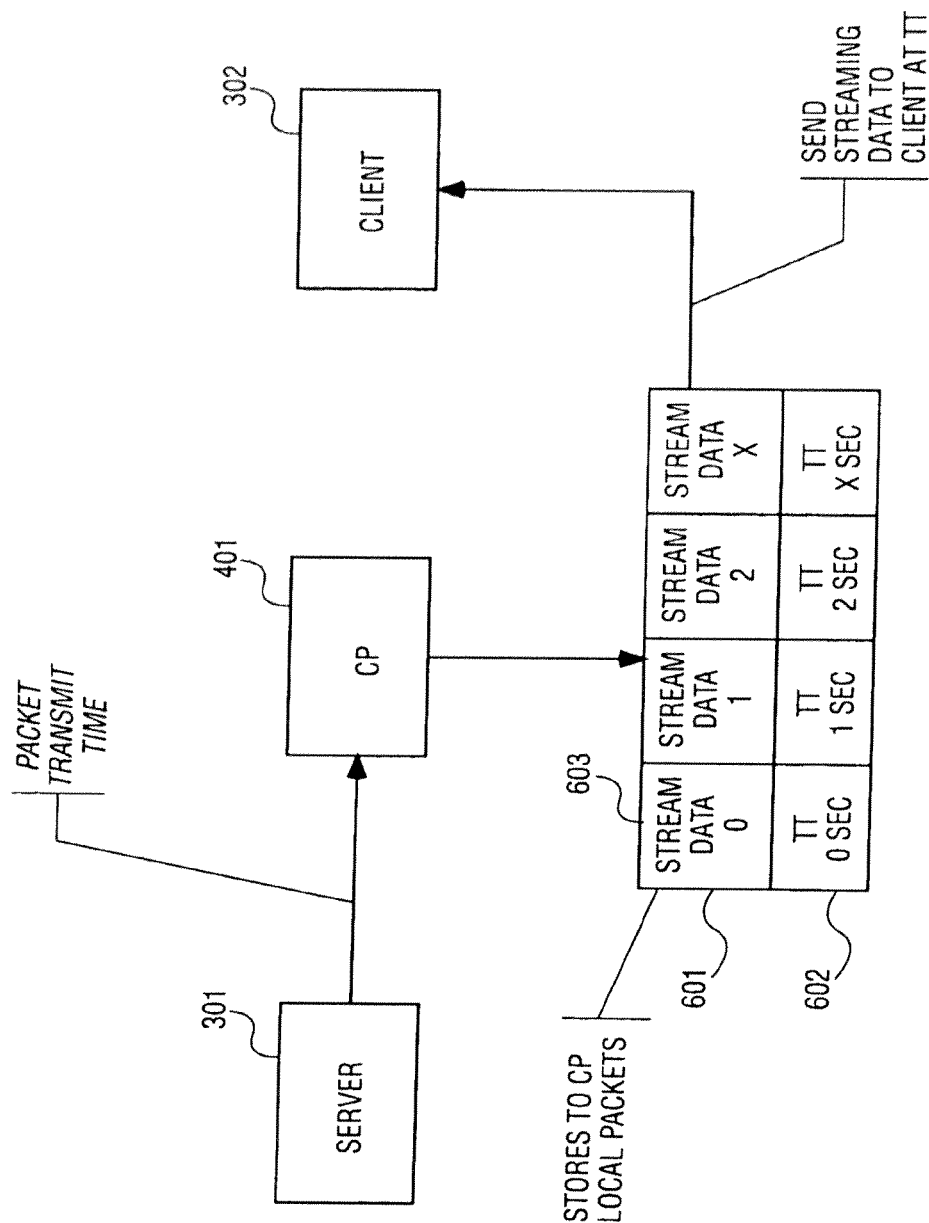
FIG. 6 illustrates one embodiment of a relationship between the server, caching proxy, and client during a transfer of a Transmit Time (TT) sub-extension to the caching proxy server and its use of TT information in transmitting streaming data to a client.

FIG. 6 shows an example of a method for transmitting packet transmit time data which may be used with various embodiments of the present invention. The server 301 is connected with the caching proxy server 401 by way of a standard communication carrying devices such as fiber optic ware link, radio frequency communication, cable wire etc. A person having ordinary skill in the art will appreciate that any one-communication device is not essential for the data transfer operation in accordance with this invention and that these communications devices are interchangeable. It must be clear that it is important for the communication devices to allow communication in both directions i.e. from server 301 to caching proxy 402 or from caching proxy 402 to server 301.

The communication between a caching proxy server 401 and the originating server 301 may be a direct communication relationship or there may also be other devices such as routers in the Internet acting as intermediaries to assist in streaming media data transfer. Typically, a caching proxy server 401 is located in closer proximity to the client 302 than the originating server 301. This close proximity may be within a company, or on a designed local area network (LAN), or in the same geographic region, whereas typically caching proxy server and original system server 301 are further apart.

The caching proxy server 401 may have a storage facility 601 to store streaming media data 603 and/or the associated RTP extensions 602. The storage facility 601 may be a local to the caching proxy server 401 or on an offsite from the caching proxy server 401 but in either case the storage is controlled by the caching proxy server 401. The caching proxy server 401 may have a link established to store data received from the server 301 for a periods of time in the storage facility 601, and then be able to retrieve the stored data at a later time for sending to client 302. In the example of FIG. 6, the streaming media data 603 and its associated RTP extension (transmit time in this case) are stored together on a storage device 601. Groups of streaming media data (e.g. a packet or a set of packets) are associated with a corresponding designation of a transmit tune so that each group has a transmit time which specifies when to transmit the particular group. It will be appreciated that the streaming media data and the associated RTP extension may be stored separately (but still be associated—e.g. packet No. xxx to be transmitted at time ABC, packet No. xxy is to be transmitted at time ABD, etc.)

In the example of FIG. 6, the streaming media data is received by the server 401 and the caching proxy server 401 receives the transmit time data from server 301 and stores it in the storing facility 601. Transmit time data may be associated with each track of streaming media data. For example, in one instance the transmit time at 0 sec 602 may be associated with corresponding streaming media data 603. In operation, in this exemplary embodiment, the streaming media data 0 will be sent to a client at transmit time 0.

Figure 7:
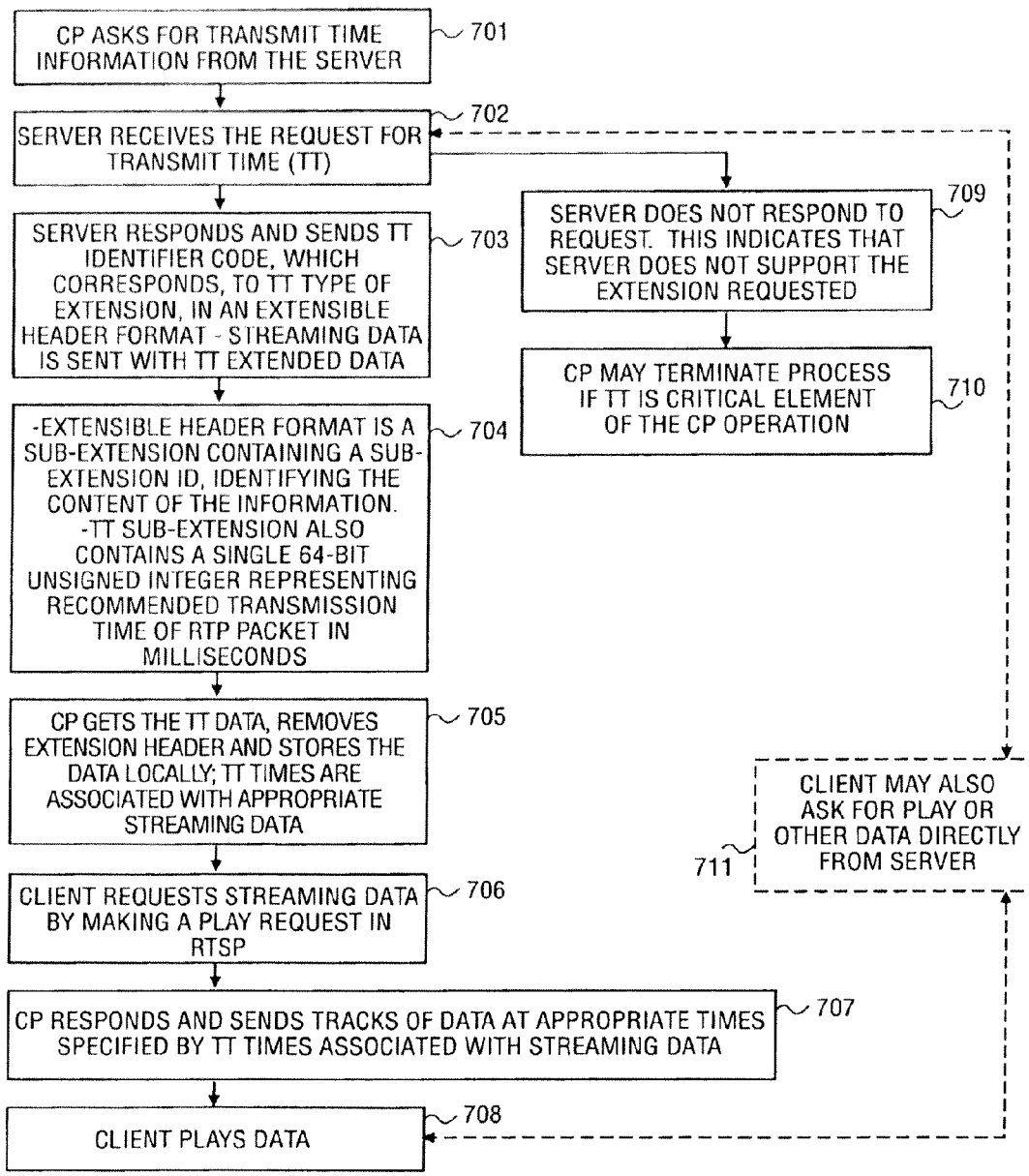
FIG. 7 illustrates one embodiment of process that takes place during transfer of a transmit time sub-extension between server and caching proxy server.

FIG. 7 shows one exemplary method for using transmit time as an RTP extension according to an embodiment of the present invention. In operation the method suggested in FIG. 7 may utilize the system architecture as suggested in one of the embodiments of the present invention shown in FIG. 6.

In one example of the method of FIG. 7, a caching proxy server 401 receives a request from client 302 for streaming media data and then requests an RTP extension which specifics transmit nine information and requests the server 301 to send transmit time sub-extension RTP data 701 and associated streaming media data. Operation 701 shows the caching proxy server's request for streaming media data and transmit time which results from this request. The server receives the request in operation 702 as shown in FIG. 7. It may also be the case that a caching proxy server 401 already had received the requested streaming media data and its associated transmit time information from the server 301 and has stored the streaming media data and associated RTP extensions at a storing facility 601. If such, then the caching proxy server 401 may start responding to clients 302 request without communicating with the originating server 301 thereby shipping to operations 707 and 708 of FIG. 7.

Assuming for illustration of this example that the original server 301 supports the transmit time information, server 301 will respond back to caching proxy server indicating its support of the requested sub-extension in operation 703. If however the transmit time sub-extension is not supported by the original server 301, the originating server 301 may or may not respond back to the caching proxy server 401 indicating its support for the requested sub-extension as shown in operation 709. In the event of an unsupported sub-extension, the caching proxy 402 may terminate the negotiation process as shown in operation 710 with the server 301 and would typically inform the client 302 of the inability to provide streaming media data. In so doing, the caching proxy server 401 may first evaluate whether the missing transmit time information is required for running its processes. If the result of the determination is that transmit time information in this particular example is a required element, then the caching proxy server may decide whether to proceed or terminate the transmission process.

The server 301 in operation 704 sends the transmit time RTP data in an extended header format according to the RTP protocol to the caching proxy server. The header may consist of the normal header fields, the sub-extension character name and a sub-extension ID 704. The sub-extension character name for a transmit time data may be a 4-character code denoted by "trti". This code may uniquely identify and describe the content of the sub-extension as being transit time data. The sub-extension ID may identify the sub-extension in the RTP packet.

A transmit time sub-extension may consist of a single 64-bit unsigned integer representing the recommended transmission time of the RTP packet in milliseconds as shown in operation 704. The transmit time may be offset from one another from the start of a media presentation. For example in one sub-cycle of operation, a session description protocol document for a uniform resource locator (URL) may include a range of 0-729.45 seconds. The client 302 may make a PLAY request 706 for the video, audio, text, graphics, and images etc. type data.

The caching proxy server 401 may receive the RTP data packet associated with streaming media data with the transmit time sub-extension as shown in more detail in FIG. 6. The caching proxy server 401 may then store the RTP transmit time data locally as shown in FIG. 6. The caching proxy server 401 may then strip off the header ID in operation 705 and send streaming media data associated with each track, in operation 707, of transmit time individually at offset times to the client 302 allowing the client 302 to carry on PLAY operation 708. An advantage of knowing and storing transit time at offsets locally at the caching proxy server, it may now be possible for the caching proxy saver 401 to selectively re-transmit data at different intervals to the client 302 or respond to clients request to send data corresponding to any particular time slot.

Figure 8:
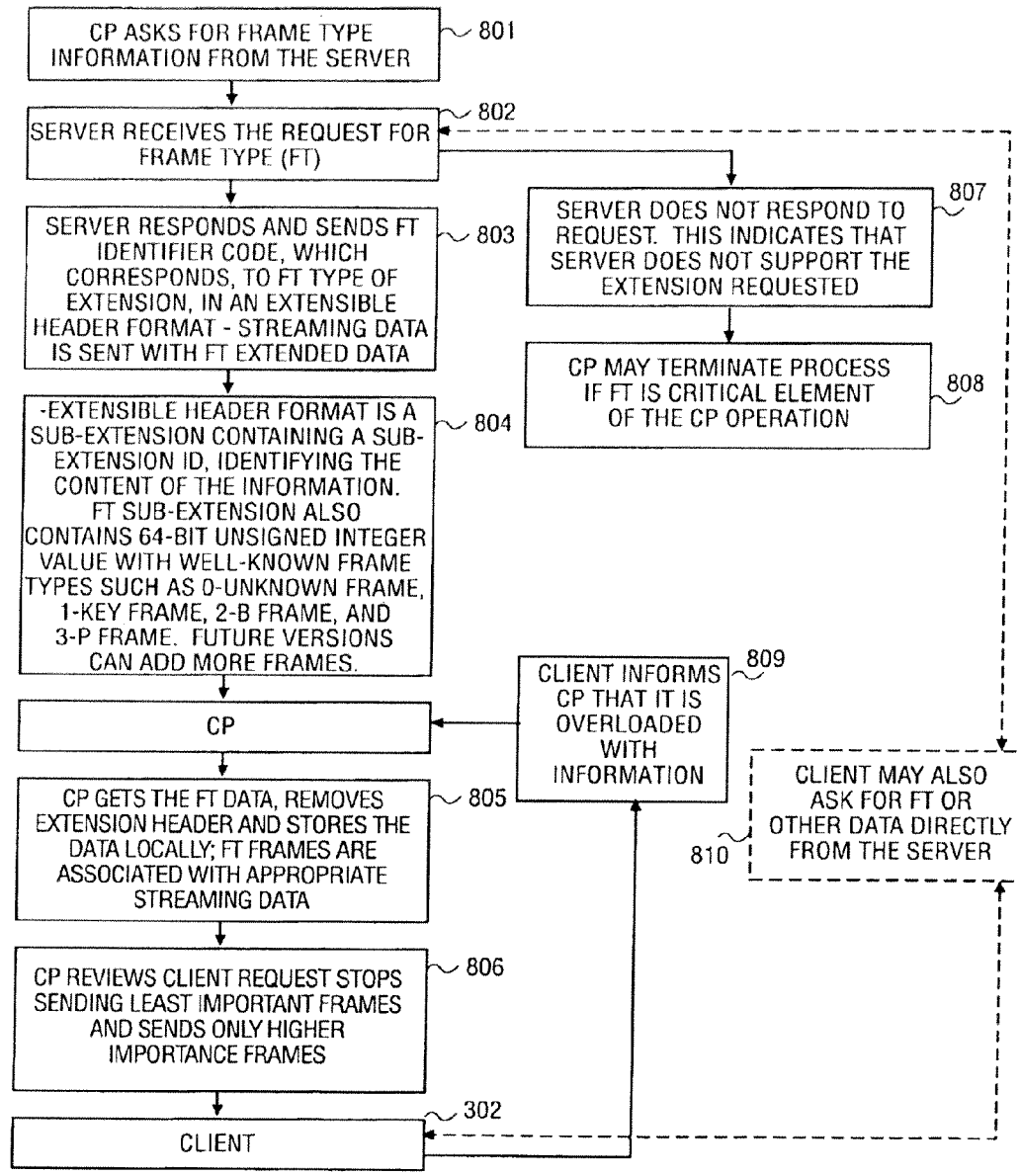
FIG. 8 illustrates one embodiment of process that takes place during transfer of a frame type sub-extension between server, and caching proxy server.

FIG. 8 shows one exemplary method for a stream thinning process by a caching proxy server according to an embodiment of the present invention. In operation a client 302 and caching proxy server 301 communicate with each other to assist in sending and receiving streaming media data and assisting in traffic flow control to the client 302. In a method according to FIG. 8, a client 302 communicates with the caching proxy server 401 and indicates that it is overloaded or the caching proxy server 401 detects that the client is overloaded. As part of this communication, the caching proxy server 401 ensures that the client 302 does not get an amount of data that exceeds its data handling capacity. Caching proxy server also prevents at least selected frame being "dropped" or missing as a result of an overloaded client 302.

A principle behind FIG. 8 is that an overloaded client 302 may notify the caching proxy server that it has reached its capacity for receiving RTP data (e.g. streaming media data). The client 302 may have been overloaded due to several reasons including that a caching proxy server is sending RTP data very quickly and the client 302 is having difficulty receiving data at such a fast pace. The client 302 may inform the caching proxy server to stop sending streaming media data altogether, or to send data at a slower pace. The client 302 may also inform the caching proxy server to send only selected order of frames and not send any low order frames. The caching proxy server 401 will use the frame type data to determine which frames to transit to client 302; typically, higher priority frames are transmitted while lower priority frames are not transmitted.

A method of FIG. 8 begins in operation 801 in which a caching proxy server 402 may communicate with the originating server 301 and request the server 301 for streaming media data and its associated frame type information. Tire frame type identities various types of data (e.g. frames) in streaming media data which allows "thinning" which may be defined as reducing frames, sending frames at a slower pace, or not sending certain frames at all. It will be appreciated that thinning apples to various types of data and that "frames" may be considered to be such various types of data. The server 301 may receive the request in operation 802 and may respond in operation 803 to the caching proxy server 401 indicating whether the server 301 supports the requested frame type streaming media data. If the server 301 supports this, the server's 301 response in operation 803 includes sending the associated RTP frame type sub-extension in a format described in block 804 along with an identifier code corresponding to the frame type extension requested by name in operation 801.

If the server 301 does not support frame type sub-extension then file caching proxy server may terminate in operation 807 and 808 the communication with server 301. The server 301 may indicate that it does not support the requested frame type streaming media data by either responding or not sending any response to the Caching Proxy server 401 which would also indicate no support of the requested RTP extension for the streaming media data. However, if the server 301 supports the frame type sub-extension, the caching proxy 402 may inform the server 301 to send the streaming media associated with the frame type information. In one embodiment, the server 301 may send the supported streaming media data sub-extensions without any further requests from the caching proxy server 401. In another embodiment, the server 301 may wait for further a further request from the caching proxy server 401 to send the supported streaming media data sub-extensions.

The server 301 may then send the RTF sub-extension in an extended header format. The frame type sub-extension may consist of a single 16-bit unsigned integer value with several well-known values representing different frame types. The well known values may be "1" for a key frame, "2" for a p-frame, or "3" for a b-frame where key frame maybe of the highest order and most importance, b-frame of the lowest order and least importance, and b-frame somewhere between key frame and b-frame in terms of importance. There may also be other frames that may be added to this format.

The caching proxy server 401 may then store the streaming media data and its associated frame type sub-extension in its storing device 601 after receiving them from the originating server 301. This is shown in operation 805 of FIG. 8. The caching proxy server 401 may then enter into a negotiating process with the client 302 in evaluating the client's capability at the time to handle streaming media data traffic 809. Based upon the result of the negotiation process 809, the caching proxy server 401 may thin frames (sending only selected, predetermined frames) and send streaming media data associated with selected frames 806 to the client 302.

For example, in one cycle of operation a client 302 may inform the caching proxy server that it is overloaded. The client 302 may inform the caching proxy server 401 to stop sending frames altogether or to lower the bit rate if the transmission falls behind. In the case of lowering the bit rate and slowing down, the caching proxy server 401 may stop sending the lowest order frames of the streaming media data, the b-frame to the client 302. The caching proxy server 401 and the client 302 may communicate further to evaluate if the client 302 is still overloaded. In one embodiment, if the client 302 is capable of handling die load alter thinning of the b-frame then the caching proxy server may send the client 302 key-frames and p-frames. However if the client 302 is stilt overloaded then the caching proxy server 401 may further reduce the data traffic to the client 302 and stop sending p-frames. The caching proxy server 401 may further evaluate client's 302 data handling capability and determine if any more frame thinning is necessary to reduce load on client 302. In another embodiment the client 302 may directly specify to the caching proxy server 401, which frames to send and which frames not to send until a subsequent request is sent to the caching proxy server 401 to change sending considerations.

Figure 10:
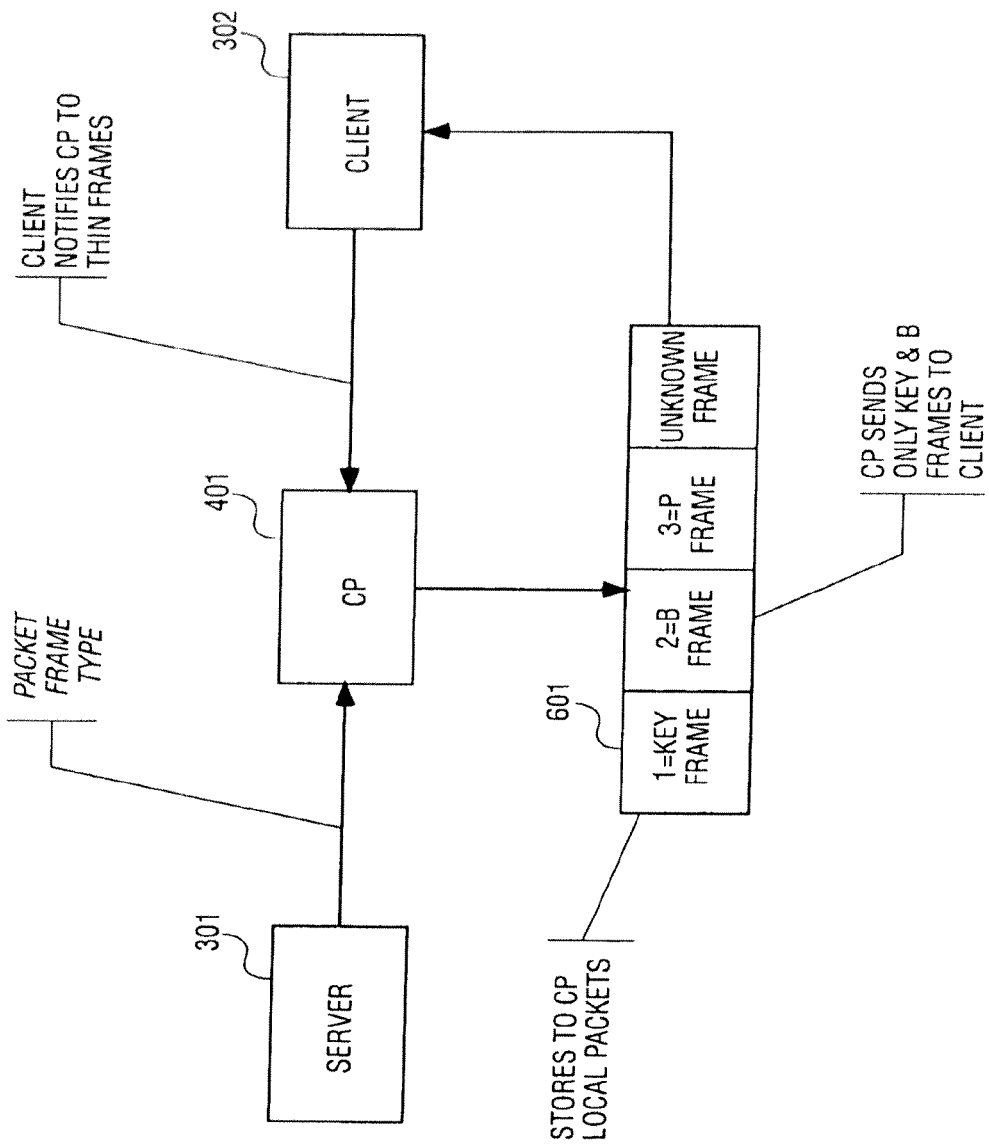
FIG. 10 illustrates one embodiment of a relationship between the server, caching proxy, and client during a transfer of a Frame Type sub-extension.

After a client 302 retains its capability to cache frames, the caching proxy server 401 may again start sending the lower order frames to the client 302. It may again send all the frames at a high speed or send the frames according to requests received by the client 302. In the event that the client 302 gets overloaded again, the caching proxy-server 401 may repeat the thinning process until the client 302 is able to handle caching data again. FIG. 10 shows an example of how a caching proxy server 401 receives streaming media data and its associated frame type (FT) RTP extension data from an originating server 301 and stores the streaming media data and associated frame type extension data on a storage device (e.g. a local hard disk of the caching proxy server 401) and then uses the frame type data to selectively thin frames of the streaming media data which is being transmitted to a client 302.

Communication between a caching proxy server 401 and originating server 301 or caching proxy server 401 and client 302 is carried on using real-time transfer protocol (RTP) and real-time streaming protocol (RTSP) for sending/receiving streaming media data. An originating server 301 sends streaming media data packets in a streaming media format using RTP to a caching proxy server 401 whenever a transmission of streaming media data occurs. One of the embodiments of the present invention is to be able to modify the current existing RTP headers by being able to expand the header with sub-extensions and also be able to make the header format variable. Expansion of the header is useful because a caching proxy server 401 may need several pieces of information along with a RTP packet that will aid in providing a good quality streaming media data packet and smooth delivery to the client 302. The extra in formation that may be needed can be provided by attaching it to the existing header by being able to expand the header field. It should also be clear that variability of the extended header is important because the extra pieces of information needed by the caching proxy 402 may vary each time. To accommodate for this variation, the extended header may have the capability to change and provide various types of information as needed by the caching proxy server 401.

In accordance with one embodiment of the invention, in operation, an extended header consists of a normal header fields. A person having ordinary skill in the art is aware of the various header fields that are normally used in operation. The normal header fields are immediately followed by header extension fields. The extension field consists of several sub-extensions. There may be several header sub-extensions that are unrelated to each other and may vary per request of the caching proxy server 401. The sub-extensions may have an extension type of "se". The RTP extension length may be the total length of all the sub-extensions and may be defined in 32-bit words thereby being in full compliance with the RTP protocol.

The "se" sub-extension format may be such that a sub-extension ID immediately follows the normal RTP header field. The ID may identify the sub-extension within the RTP packet. This ID may be a one octet ID generated by the server 301 for each individual named RTP sub-extension. Each sub-extension may also have its unique name that is defined by a four-character name code. This name code uniquely identities and describes the type of data in each sub-extension. For example, the four character name code for a transmit time sub-extension may be "trti", frame type sub-extension may be "frty" and packet position sub-extension maybe "papo". This name code is associated with the one octet ID (generated by the server 301) so that the caching proxy server 401 can identify, form the octet ID the appropriate RTP extension data when it receives streaming media data.

In one embodiment of the present invention, the unique name may be "frty" associated with streaming media data for frame type information. The unique name "frty" may also have an unsigned integer associated with each different type of frame, in one embodiment the unsigned integer may be "1" for a key-frame, "2" for a p-frame, and "3" for a b-frame. A user may also add any additional frames in the future as need and technology advances and may use this header format without any need for much modifications.

In another embodiment of the present invention, the unique name may be "trti" associated with streaming media data for transmit time type information.

In another embodiment of the present invention, the unique name may be "papo" associated with streaming media data for packet position type information.

Figure 9:
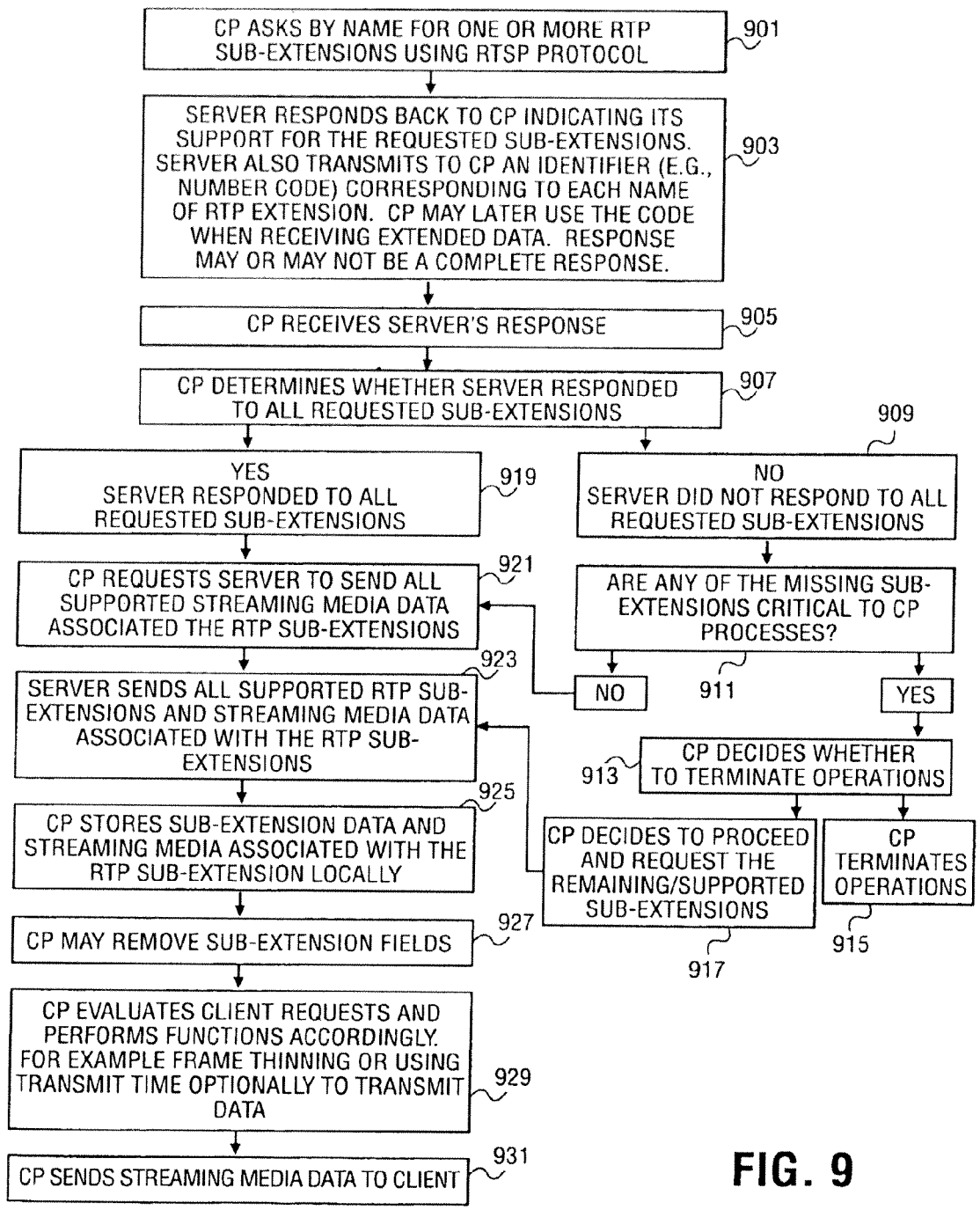
FIG. 9 is a flow diagram of one embodiment of an operation to provide various types of information to a caching proxy in an extensible header format.

FIG. 9 shows an exemplary method of several aspects of the present invention. In a portion 901, a caching proxy server 401 requests streaming media data from an originating server 301 and also requests by name one or more RTP extensions. This request is made using the RTSP protocol. In operation 903, the server typically responds back (e.g. of a response would be an echo) a response to the caching proxy server 401 indicating its support for the requested RTP extensions. The server 301 also transmits to the caching proxy server 401 an identifier, such as a number code which corresponds to each name of die requested RTP extensions. Typically, the caching proxy server 401 will use the number code later in identifying received extended RTP data. The number code allows the caching proxy server 401 to identity the various types of RTP extension data in the streaming media which it receives as the server 301 may not use the name to designate the RTP extension type. In operation 905, the caching proxy server 401 receives the server's 301 response and then in operation 907, the CP server 401 determines whether the server 301 responded to all of the requested RTP extensions.

If the server 301 did not respond to all requested RTP extensions, then processing proceeds to operation 909, followed by operation 911 in which it is determined whether any of the missing RTP extensions are critical to the caching proxy server's 401 processing. If they are not critical, then processing proceeds to operation 921. If they are critical, then the caching proxy server 401 determines in operation 913 whether or not to terminate the operation/communication with the originating server 301. As shown in operations 915 or 917, the caching proxy server 401 may terminate operations/communications with the server 301 for this particular streaming media data which was requested or they proceed to receive the streaming media and whatever supported extensions can be provided.

In operation 921, the CP server 401 requests the originating server 301 to send the requested streaming media data and its associated RTP extensions. In one embodiment, the CP server 401 transmits a "PLAY" request using RTSP, and this causes the server 301 to respond in operation 923 by transmitting the streaming media data and the associated RTP extensions. In operation 925, the CP server 401 stores the streaming media data received from the server 301 and also stores the associated RTP extension data. In operation 927, the CP server 401 may remove certain RTP extension data from the streaming media file, such as the transmit time or the frame type data. This is done in order to avoid sending the transmit time or the frame type information to the client 302 which receipts streaming media data. The RTP extension data, which is removed from the streaming media data, is stored separately but associated with the streaming media data. For example, transmit times for various packets are stored separately from the packets, but the association existing in the data received from the server 301 between the transmit time and the corresponding packets is maintained even when the transmit times are stored separately so that the caching proxy server 401 may determine the appropriate transmit time for each of the packets in the streaming media data. In operation 929, the caching proxy server 401 evaluates a client's 302 request for streaming media data and responds accordingly. It will be appreciated that a client 302 will negotiate for streaming media data using the RTSP protocol and the CP server 401 will respond with the streaming media data by transmitting the data to the client 302. In addition, the client 302 may request frame thinning. Further, the caching proxy server 401 may use the transmit times to determine when to transmit to various packets in the streaming media data to the client 302.

Figure 11:
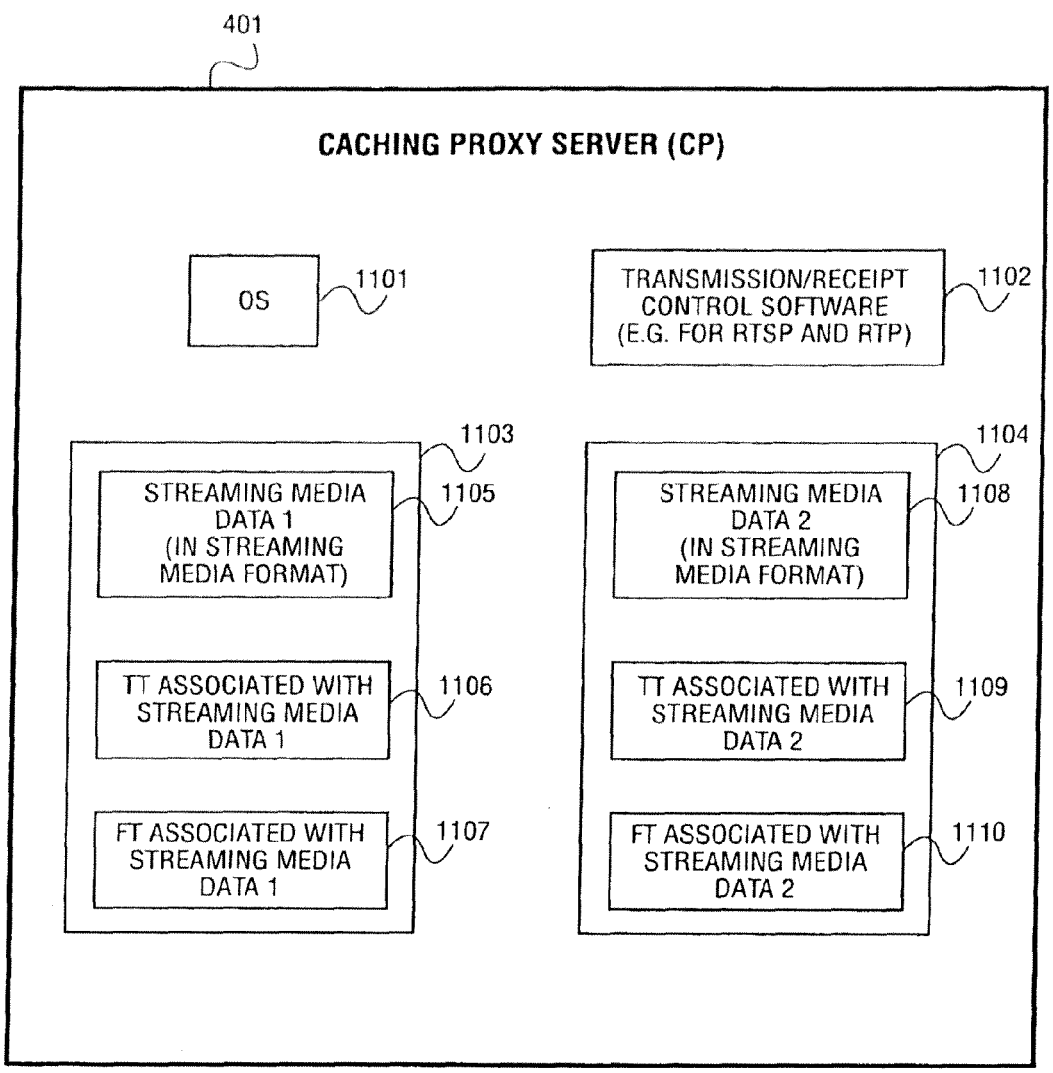
FIG. 11 illustrates a block diagram of a machine readable medium which stores executable computer program instruction for execution by an exemplary caching proxy server, which may be used in accordance with one embodiment of the present invention.

FIG. 11 shows one type of exemplary machine readable media (e.g. RAM or hard disk or combination thereof) for storing executable computer program instructions for a caching proxy server 401 that may be used in accordance with the present invention. The caching proxy server 401 typically will have its own operating system (OS) software 1101. This software 1101 may be the Macintosh OS. Or Windows NT or Unix, or other well known operating systems The control software 1102 is for transmitting or receiving streaming media data using, for example RTP and RTSP protocols. The software 1102 is normally able to retrieve or send various types of streaming media data packets and direct commands for storing the received media in a storing facility 601. Thus software 1102 performs the negotiation process with an originating server 301 and receives streaming media data, and its associated RTP extensions and causes the streaming media data and its associated RTP extensions to be stored on a storage device controlled by caching proxy server 401. FIG. 11 shows the storage of two streaming media data files 1103 and 1104.

Streaming media data file 1103 may contain streaming media data 1 in streaming media format 1105, transmit time associated with streaming media 1 (1106), and frame type associated with streaming media 1 (1107). In one embodiment, the operating system 1101 and control software 1102 may have the capability to separate streaming media data in packet 1 from other packets and store it separately in a storing facility 601 and to extract the RTP extensions (e.g. Transmit Time data or Frame Type data) from the stored streaming media packets and store these separately so that these packets do not include the RTP extensions.

The streaming media data file of 1104 may contain streaming media data 2 in streaming media format 1108, transmit time associated with streaming media data 2 (1109), and frame type associated with streaming media 2 (1110).

The streaming media data 1105 and 1108 will usually not be in the same original format as the media data was at the originating server 301. The streaming media data 1105 and 1108 may however be a full "pristine" copy of the original media data, because the "papo" extension may be used by the caching proxy server 401 to search for any missing packets in the streaming media data 1105 and 1108 and to request (again) these packets from the originating server.

Figure 12:
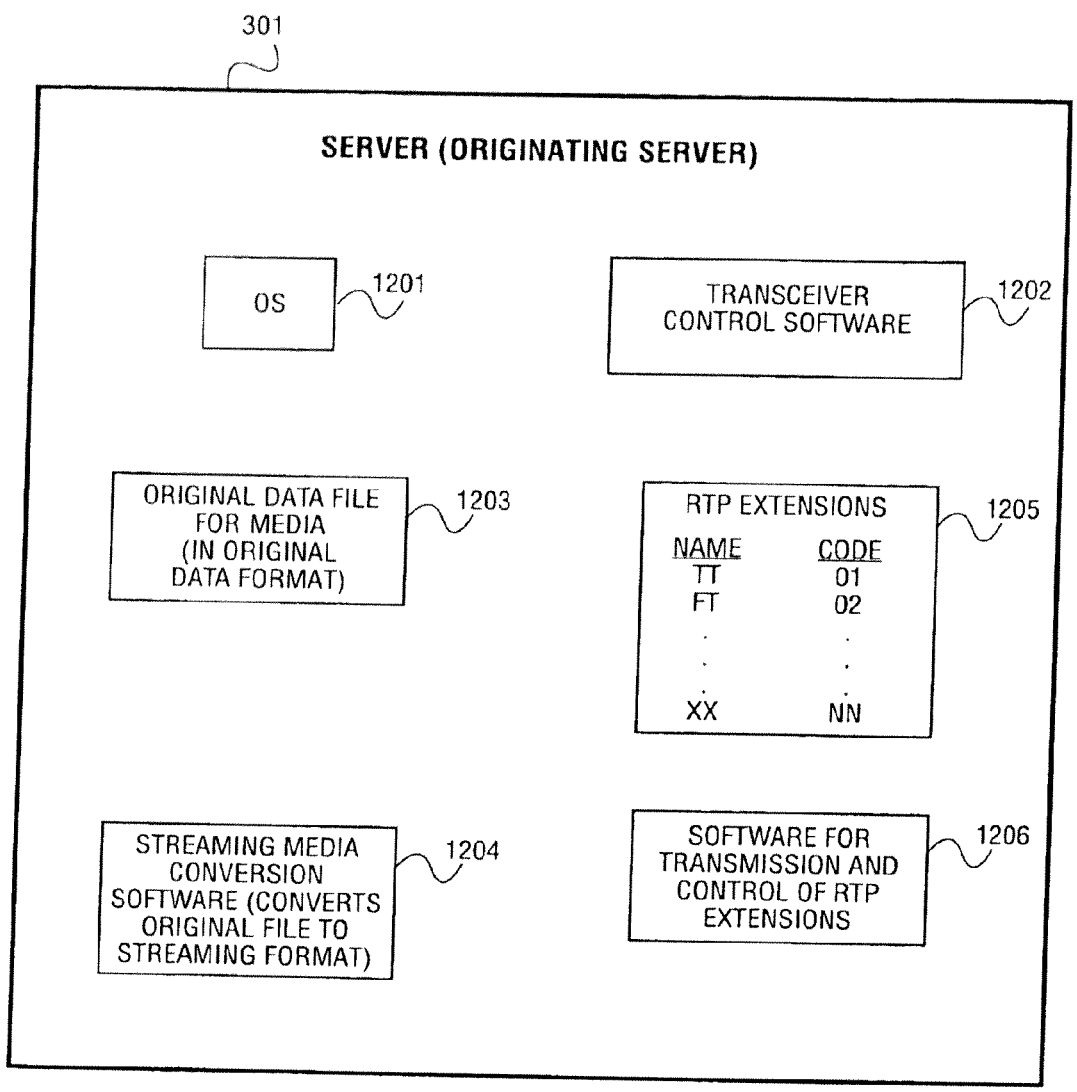
FIG. 12 illustrates a block diagram of a machine readable medium which stores executable computer program instruction for execution by an exemplary originating server (server), which may be used in accordance with one embodiment of the present invention.

FIG. 12 shows one type of exemplary machine readable media (e.g. RAM or hard disk or combination thereof) for storing executable computer program instructions for an originating server 301 that may be used in accordance with the present invention. The server 301 will typically have its own operating system 1201.

The control software 1202 is for transmitting streaming media data to a caching proxy server 401 or to a client 302 using the RTP and RTSP protocols and the RTP extensions of the invention. Further, software 1202 receives requests from a client 302 or a caching proxy server 401 for streaming media and negotiates with a caching proxy server 401 for various types of streaming media data and associated RTP extensions, and responds to various requests by caching proxy servers 401 or clients 302.

Software 1204 converts original media data 1203, which is usually not in a packet format, to a streaming media data format (e.g. packet format) for transmitting to caching proxy sever 401 or client 302. When converted, the converted streaming media data is a representation of the original media data 1203 that has a different format than the formal of the original media data 1203.

The software 1206 creates RTP extension headers associated with various types of streaming media data. The system may assign various ID names and codes 1205 associated with various RTP extensions to various types of streaming media data before its sent to a caching proxy 401 or a client 301. The software 1206, in conjunction with software 1202, performs the negotiation process with a caching proxy server 401 (or, in some cases where the client asks for an RTP extension, such as a security or encryption or authentication extension, the client) to transmit RTP extension data for an associated streaming media data and also performs the transmission process of transmitting streaming media data with its associated RTP extension.

Figure 13:
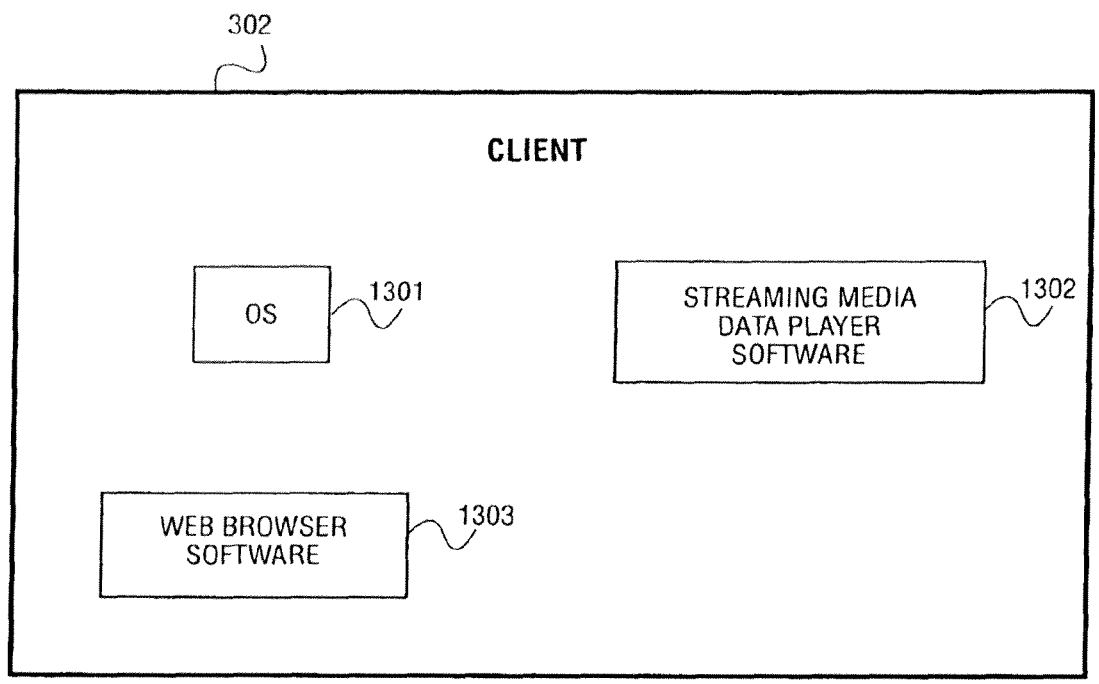
FIG. 13 illustrates a block diagram of a machine readable medium which stores executable computer program instruction for execution by an exemplary client, which may be used in accordance with one embodiment of the present invention.

FIG. 13 shows one type of exemplary machine readable media (e.g. RAM or hard disk or combination thereof) for storing executable computer program instructions for a client server 302 that may be used in accordance with the present invention. The client server 302 will typically have its own operating system 1301 such as a Macintosh OS, or Windows NT, or Unix, or other well-known operating systems. The client's media may also include Web Browser software 1303 such as Netscape's Navigator or Microsoft's Internet Explorer.

The streaming media data player software 1302 is for receiving and playing streaming media data transmitted to the client using the RTP protocol. The streaming media data player software 1302 may be Quicktime software from Apple computer or the Real Player from Real Networks. The streaming media data player software 1302 is typically able to send requests to a caching proxy server 401 or a server 301 for various different types of streaming media data and to receive and present (e.g. display images and produce sound) a representation of streaming media data.

In yet another embodiment the streaming media data player software 1302 may be able to communicate and negotiate with a caching proxy server 401 in order to regulate incoming data traffic to handle its load better (e.g. the software 1302 may ask a CP server 401 to perform frame thinning).

In the foregoing specification, the invention has been described with reference to specific exemplary embodiments thereof. It will, however, be evident that various modifications and changes may be made thereto without departing from broader spirit and scope of the invention as set forth, in the appended claims. The specification and drawings are, accordingly, to be regarded in an illustrative rather a restrictive sense.

What is claimed is:

1. A method of frame thinning by a data processing device coupled to a network, comprising:
   receiving a message through the network, said message indicating a need to thin streaming media data being sent through the network;
   assigning a plurality of frame types to the streaming media data, the frame types including at least one known frame type;
   evaluating priority of streaming media data based on frame type; and
   sending only selected streaming media data,
   wherein the message is received at a caching proxy server that sends the selected streaming media data to a client device, the method further comprising performing the following at the caching proxy server:
   prior to receiving the message, determining based on a data receiving rate or a data processing rate of the client device, that the client device requires frame thinning;
   checking whether an originating server from which the streaming media data is sent to the caching proxy server supports all frame types required for frame thinning; and
   responsive to receiving the message, and conditional upon determining that the originating server supports all frame types required for frame thinning, thinning the streaming media data to generate the selected streaming media data.

2. A method of claim 1, wherein said evaluating comprising:
   naming unsigned integers to the frame types;
   assigning an integer value of "0" to an unknown frame type;
   an integer value of "1" to a key frame type;
   an integer value of "2" to a p-frame type; and
   an integer value of "3" to a b-frame type.

3. A method of claim 2, wherein said key-frame being most important in priority than any other frames.

4. A method of claim 2, wherein said p-frame being less important in priority than key-frame, and more important in priority than b-frame.

5. A method of claim 2, wherein said b-frame being less important in priority than p-frame.

6. A method of claim 2, wherein said b-frame being less important in priority than key-frame.

7. A method of claim 2, wherein said unknown-frame being either more or less important in priority than key-frame, p-frame and b-frame.

8. A method of claim 2, wherein said key-frame being more important in priority than p-frames, b-frames, and any other frames.

9. A method of claim 1, further comprising:
   receiving a second message to further thin streaming media data;
   processing message and eliminating more selected streaming media data and sending streaming media data of higher priority.

10. A method of claim 9, wherein said selected streaming media frame being eliminated being a b-frame, and sending streaming media data with higher priority than b-frame.

11. A method of claim 9, wherein said streaming media data being eliminated being a p-frames and b-frame, and sending frames with higher priority than both p-frames and b-frames.

12. A method as in claim 1, wherein the checking involves sending a request to the originating server for the streaming media data together with a request for the originating server to identify those frame types that are associated with the streaming media data and supported by the originating server.

13. A method as in claim 2, wherein the unsigned integer is sized to allow additional integer values to be assigned to other, unspecified frame types.

14. A non-transitory machine-readable medium that provides executable instructions, which when executed by a set of processors, cause said set of processors to perform frame thinning operations by a data processing device coupled to a network comprising:
   receiving a message through the network to thin frames in a streaming media data transmission from the data processing device;
   assigning a plurality of frame types to the streaming media data, the frame types including at least one known frame type;
   evaluating priority of frames based on frame type; and sending only selected frames,
wherein the instructions cause the set of processors to send the selected frames to a client device, the instructions further causing the set of processors to perform the following:
prior to receiving the message, determining based on a data receiving rate or a data processing rate of the client device, that the client device requires frame thinning;
checking whether an originating server from which the streaming media data is sent to the data processing device supports all frame types required for frame thinning; and
responsive to receiving the message, and conditional upon determining that the originating server supports all frame types required for frame thinning, thinning the streaming media data to generate the selected frames.

15. A machine-readable medium as in claim 14, wherein said frame priority being evaluated by naming unsigned integers to the frame types, said unsigned integers comprising:
assigning an integer value of "0" to an unknown frame type;
an integer value of "1" to a key frame type;
an integer value of "2" to a p-frame type; and
an integer value of "3" to a b-frame type.

16. A machine-readable medium as in claim 15, wherein said key-frame being most important in priority than any other frames.

17. A machine-readable medium as in claim 15, wherein said p-frame being less important in priority than key-frame, and more important in priority than b-frame.

18. A machine-readable medium as in claim 15, wherein said b-frame being less important in priority than p-frame.

19. A machine-readable medium as in claim 15, wherein said b-frame being less important in priority than key-frame.

20. A machine-readable medium as in claim 15, wherein said unknown-frame being either more or less important in priority than key-frame, p-frame a b-frame.

21. A machine-readable medium as in claim 15, wherein said key-frame being more important in priority than p-frames, b-frames, and any other frames.

22. A machine-readable medium as in claim 16, further comprising:
receiving a second request to further thin frames;
processing request and eliminating more selected frames and sending frames of higher priority.

23. A machine-readable medium as in claim 22, wherein said selected frame being eliminated being a p-frame, and sending frames with higher priority than p-frame.

24. A machine-readable medium as in claim 22, wherein said selected frame being eliminated being a p-frames and b-frame, and sending frames with higher priority than both p-frames and b-frames.

25. A machine-readable medium as in claim 14, wherein the checking involves sending a request to the originating server for the streaming media data together with a request for the originating server to identify those frame types that are associated with the streaming media data and supported by the originating server.

26. A machine-readable medium as in claim 15, wherein the unsigned integer is sized to allow additional integer values to be assigned to other, unspecified frame types.

27. A frame thinning data processing device coupled to a network comprising:
means for receiving a message through the network to thin frames in a streaming media data transmission from said data processing device;
means for assigning a plurality of frame types to the streaming media data, the frame types including at least one known frame type;
means for evaluating priority of frames based on frame type;
means for sending only selected frames to a client device;
means for prior to receiving the message, determining based on a data receiving rate or a data processing rate of the client device, that the client device requires frame thinning;
means for checking whether an originating server from which the streaming media data is sent to the data processing device supports all frame types required for frame thinning; and
means for responsive to receiving the message, and conditional upon determining that the originating server supports all frame types required for frame thinning, thinning the streaming media data to generate the selected frames.

* * * * *

UNITED STATES PATENT AND TRADEMARK OFFICE
CERTIFICATE OF CORRECTION

| | | |
|---|---|---|
| PATENT NO. | : 8,732,269 B2 | Page 1 of 1 |
| APPLICATION NO. | : 13/313958 | |
| DATED | : May 20, 2014 | |
| INVENTOR(S) | : Denis Serenyi et al. | |

It is certified that error appears in the above-identified patent and that said Letters Patent is hereby corrected as shown below:

In the Claims

Claim 20, Column 19, line 39, please change:

"than key-frame, p-frame a b-frame" to -- than key-frame, p-frame and b-frame --.

Signed and Sealed this
Eleventh Day of November, 2014

Michelle K. Lee
*Deputy Director of the United States Patent and Trademark Office*